United States Patent
Kawashima

(10) Patent No.: US 8,179,451 B2
(45) Date of Patent: May 15, 2012

(54) IMAGE SENSING APPARATUS

(75) Inventor: Toru Kawashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 12/541,498

(22) Filed: Aug. 14, 2009

(65) Prior Publication Data

US 2010/0066891 A1 Mar. 18, 2010

(30) Foreign Application Priority Data

Sep. 12, 2008 (JP) ................................ 2008-235588

(51) Int. Cl.
*H04N 5/76* (2006.01)
(52) U.S. Cl. ................................ 348/231.2; 348/333.12
(58) Field of Classification Search .. 348/211.99–211.3, 348/231.2–231.3; 386/223–226
See application file for complete search history.

(56) References Cited

U.S. PATENT DOCUMENTS

| | | | |
|---|---|---|---|
| 5,809,202 A | 9/1998 | Gotoh et al. | |
| 6,078,726 A | 6/2000 | Gotoh et al. | |
| 6,424,385 B1 * | 7/2002 | Koyama et al. | 348/734 |
| 6,950,600 B2 * | 9/2005 | Dietz | 386/326 |
| 2003/0194206 A1 * | 10/2003 | Peters et al. | 386/46 |

FOREIGN PATENT DOCUMENTS

| | | |
|---|---|---|
| JP | 06-165009 | 6/1994 |
| JP | 2000-350135 | 12/2000 |

* cited by examiner

*Primary Examiner* — Tuan Ho
(74) *Attorney, Agent, or Firm* — Cowan, Liebowitz & Latman, P.C.

(57) ABSTRACT

The present invention relates to an image sensing apparatus that photographs a moving image and records moving image data, and the image sensing apparatus has an image sensing unit and a recording unit which records moving image data obtained by the image sensing unit on a storage medium; the image sensing device extracts frames of a portion of the moving image data in accordance with a predetermined condition during recording of the moving image data by the recording unit, and stores the extracted frames in a memory as image data for RecReview. Here, the number of frames of the image data for RecReview is set, and a review unit reads out image data of frames of the set number in accordance with termination of recording of moving image data, outputs the image data of frames to a display device, and displays the RecReview images.

6 Claims, 9 Drawing Sheets

IMAGE SENSING APPARATUS

BACKGROUND OF THE INVENTION

1. Field of the Invention

The present invention relates to an image sensing apparatus.

2. Description of the Related Art

An image sensing apparatus such as an electronic camera or the like that has a memory card as a recording medium, and records a photographed still image or moving image in this recording medium, and also plays back an image recorded in such a recording medium, is well-known. A view through a lens is displayed on a display unit in such an image sensing apparatus, and the user of the image sensing apparatus can confirm and fix the composition of an image to be sensed while viewing the image displayed on the display unit. Also, photographed images can be played back and displayed on the display unit.

In particular, a function that plays back a photographed image immediately after photography (review function) is highly convenient, and is a beneficial function for the user of the image sensing apparatus. According to the review function, an image photographed immediately before can be confirmed while the image sensing apparatus is still in an image sensing mode. For this reason, because an operation of switching the image sensing device to a playback mode and designating readout processing of image data from a recording medium, image processing, or encoding processing can be omitted, there is an advantage that the user can quickly confirm a photographed image immediately after photography.

Conventionally, although a post-photography review function of a still image is commonplace in such an image sensing device, a review function for reviewing a moving image after its photography has not been adopted. In moving image photography, only a single frame at the end of photography of the moving image is normally displayed, and a review function (hereinafter, RecReview) that allows a user to confirm an important scene on a digest of a moving image immediately after photography of the moving image is desired.

With respect to this, in Japanese Patent Laid-Open No. 2000-350135 (document 1), a frame at the start of recording and a frame at the end of recording of the moving image are stored in a memory. When a review button that designates a review function is pressed by the user, the frame at the start of moving image recording and the frame at the end of recording are read out and displayed on a view finder as a RecReview. By using this technology, the user can confirm from which frame to which frame was photographed in a short time of period immediately after photography of the moving image is complete.

In Japanese Patent Laid-Open No. H06-165009 (document 2), a level of importance is assigned to each button on the camera, and a degree of importance (priority) of frame of moving image is automatically obtained based on the level of importance of a button when the button on the camera is operated during photography of the moving image. Selecting a frame of a moving image to be displayed in accordance with the priority and making possible RecReview that matches the intentions of the user at the time of photographing the moving image is proposed. By using this technology, it is possible to generate a digest image from frames extracted at each scene change in accordance with the operation of a button on the camera. Thus, the user is able to easily confirm important scenes in the photographed moving image after photography of the moving image is complete.

However, because only the frame at the start of photography of a moving image and the frame at the end of photography of the moving image are stored in the memory in the aforementioned document 1, although the scenes at the start and end of photography of the moving image can be confirmed, scenes between the start and end scenes cannot be confirmed. Also, there is the problem that scenes during photography considered to be important by the user cannot be confirmed after the photography of the moving image is complete.

Furthermore, in the camera mentioned in document 2, it is possible to determine the priority of a scene based on the operation of a button, and confirm a scene for which the priority is high immediately after photography of the moving image is complete. However, because it is not possible to consider important scene switches (for example, a rapid change in the luminance of the photographic subject, etc.) for which there is no button operation, there is the possibility that the user may not be able to obtain an intended RecReview image. Also, in the case that operation of the button occurs frequently, the amount of time needed for confirmation can be expected to be long due to the large number of scenes to be confirmed. In this case, the problem remains that the content of the photographed moving image cannot be briefly confirmed in a short amount of time, and the user's intentions cannot be satisfied.

SUMMARY OF THE INVENTION

An aspect of the present invention is to eliminate the above-mentioned problems with the conventional technology.

Another aspect of the present invention is to provide an image sensing device in which a characteristic scene can automatically be played back from a photographed moving image as an image for RecReview.

According to an aspect of the present invention, there is provided an imaging apparatus comprising: an image sensing unit; a recording unit that records moving image data obtained by the image sensing unit in a storage medium; an extraction unit that extracts a frame of a portion of the moving image data in accordance with a predetermined condition during recording operation of the moving image data by the recording unit, and stores the frame as image data for RecReview in a memory; a setting unit that sets a number of frames for the RecReview; and a review unit that reads out image data stored in the memory and outputs the image data for RecReview to a display device in accordance with termination of the recording operation of moving image data, wherein the review unit reads out image data of the number of frames set by the setting unit from the memory.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
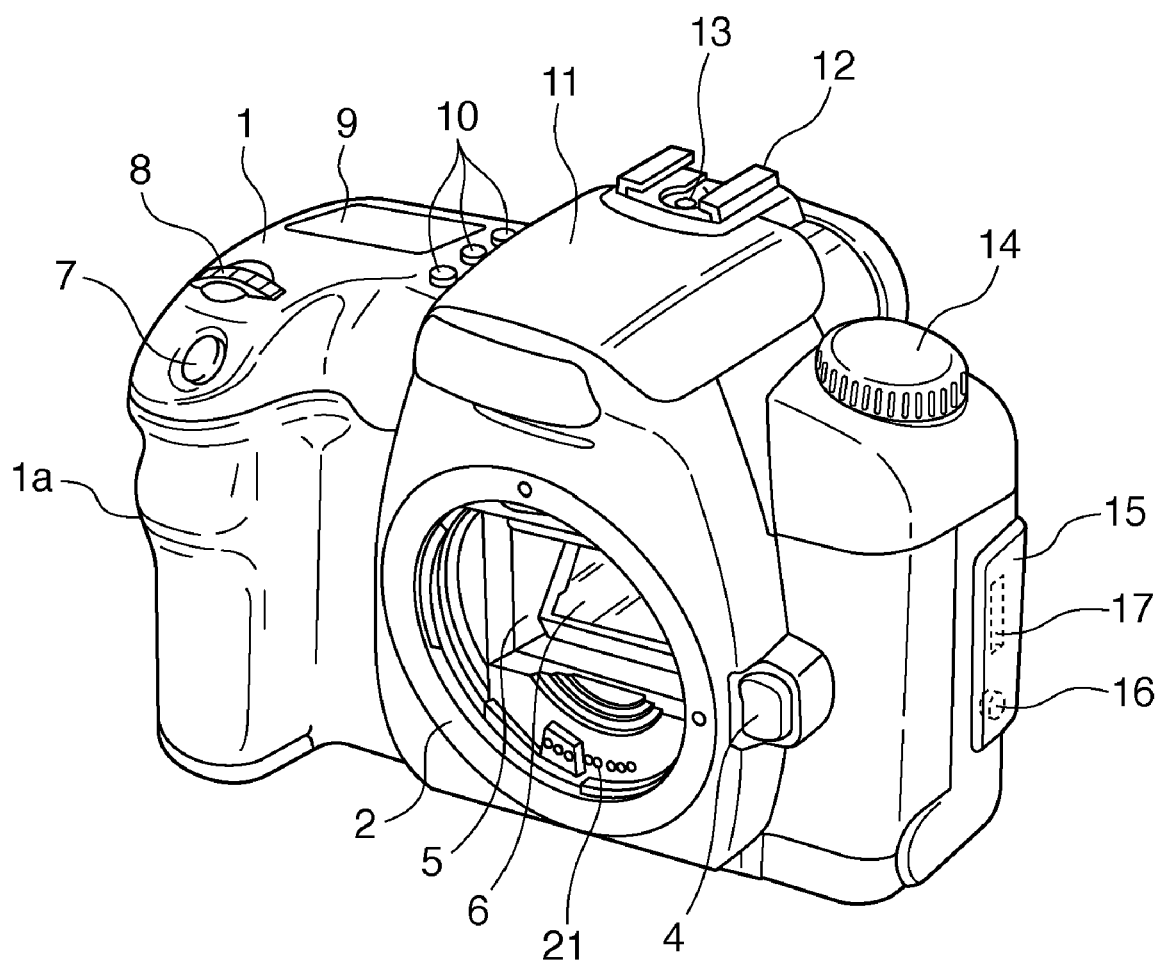
FIG. 1 depicts a perspective view of a digital single-lens reflex camera that is an example of the image sensing apparatus according to an exemplary embodiment of the present invention when viewed from the front side of the camera.
Figure 2:
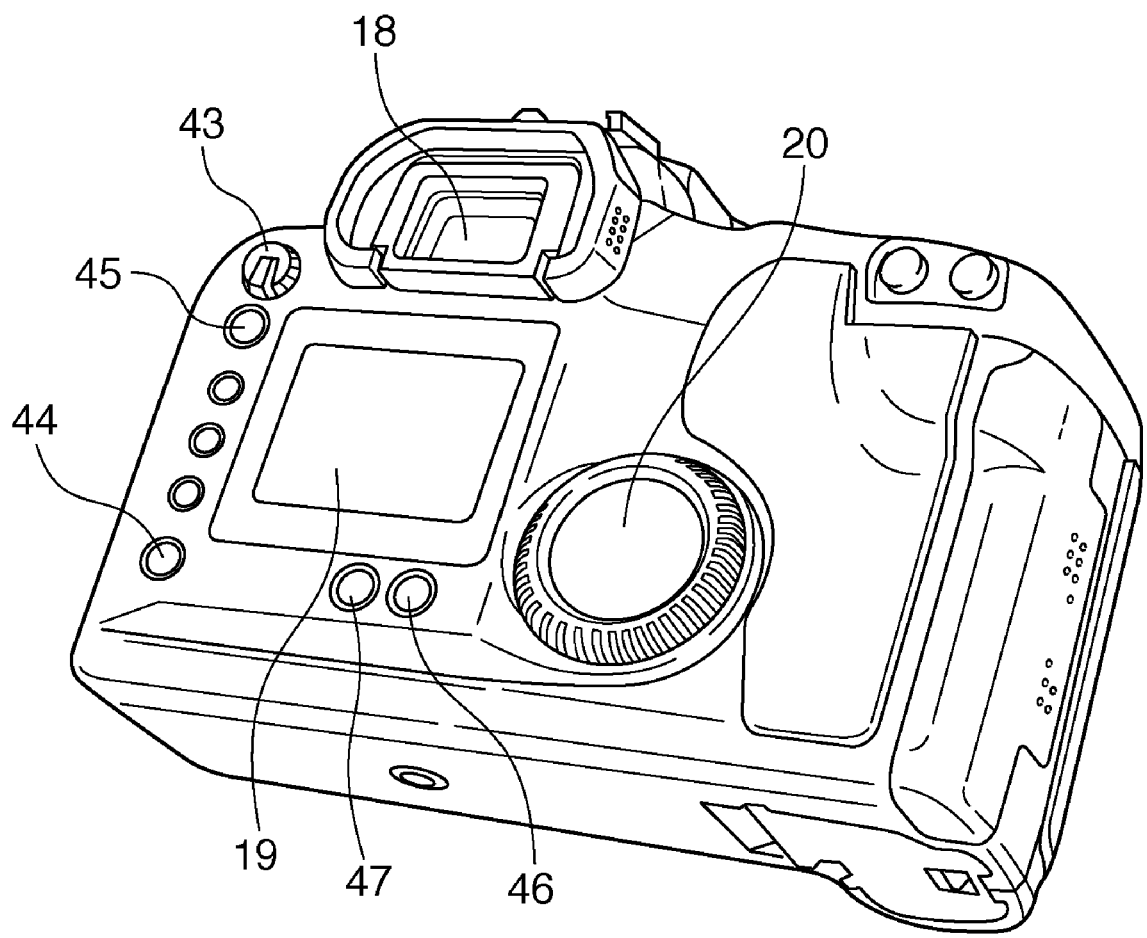
FIG. 2 depicts a perspective vies of the single-lens reflex camera that is an example of the image sensing apparatus according to the embodiment of the present invention when viewed from the rear side of the camera.

FIG. 1 and FIG. 2 are diagrams illustrating the exterior appearance of the single-lens reflex digital camera, which is an example of the image sensing apparatus according to an exemplary embodiment of the present invention. Specifically, FIG. 1 is a perspective diagram when viewed from the front side of the camera, and illustrates a state in which the photographing lens unit has been removed, while FIG. 2 is a perspective diagram when viewed from the rear side of the camera.

Figure 3:
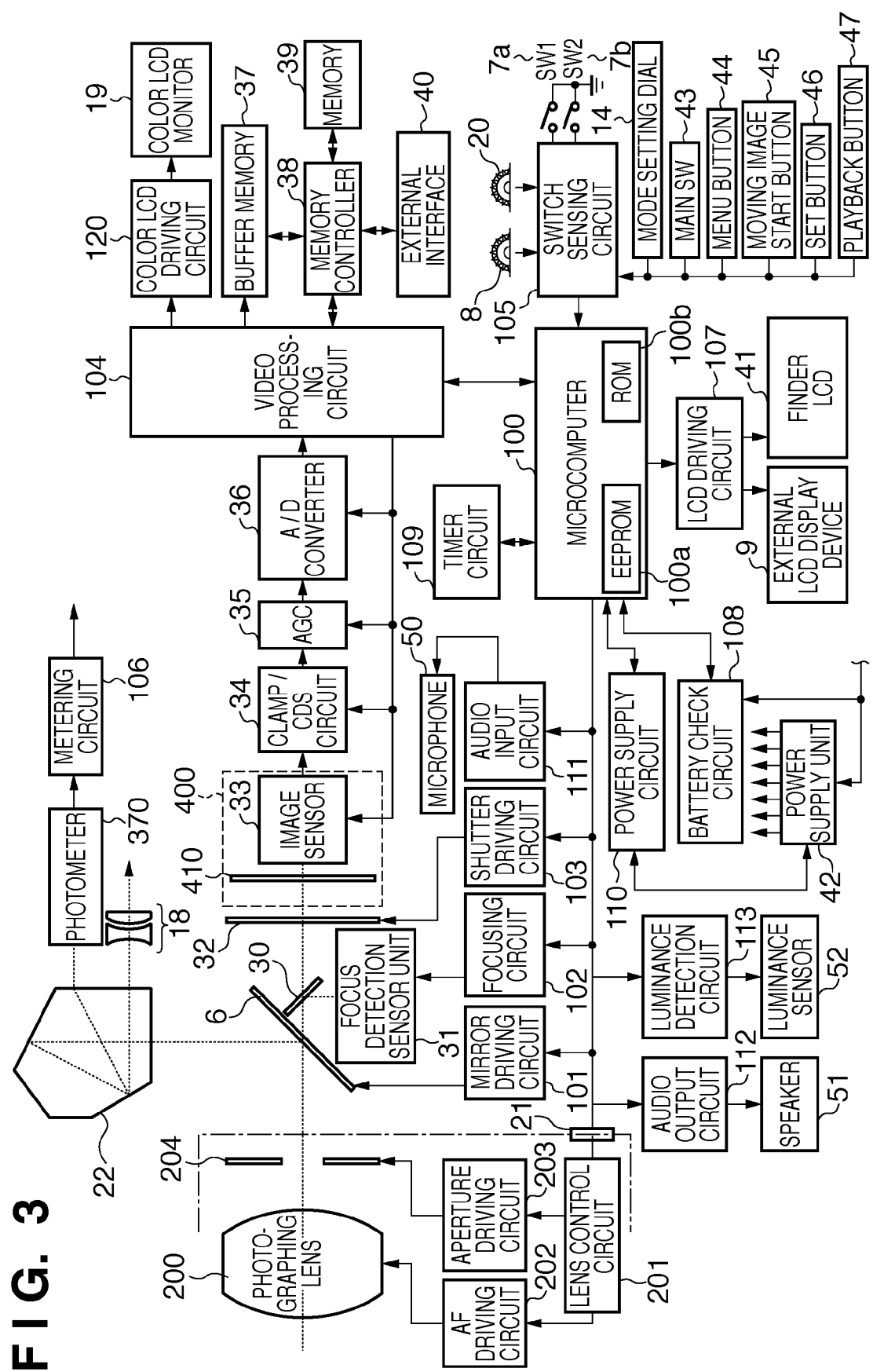
FIG. 3 is a block diagram describing the principal electrical composition of the single-lens reflex camera according to the present embodiment.

In FIG. 1, reference numeral 1 denotes a camera main body, and a grip unit 1a that protrudes in the forward direction such that a user can easily grip and stabilize the camera during image photography is provided. Reference numeral 2 denotes a lens mount that fixes a detachable photographing lens unit (not shown) to the camera main body 1. A mount contact point 21 allows communication of a control signal, state signal and data signal, etc., between the camera main body 1 and photographing lens unit, and also has a function of providing electric power to the photographing lens unit. Also, the mount contact point 21 may be composed to allow not only electrical communication, but also optical communication or audio communication, etc. Reference numeral 4 denotes a lens unlock button that is depressed to detach the photographing lens unit. Reference numeral 5 denotes a mirror box located inside the camera housing, and photographing light flux that passes through a photographing lens is directed here. A quick return mirror 6 is arranged inside the mirror box 5. The quick return mirror 6 can be in a state in which it is held at a 45° angle with respect to the photographing light axis in order to direct the photographing light flux toward a pentaprism 22 (FIG. 3), and a state in which it is held in a position which is sheltered from the photographing light flux in order to direct the light to an image sensor 33 (FIG. 3). The image sensor 33 performs photo-electric conversion of a photographic subject and continuously generates an image signal during photography of a moving image.

On the side of the grip unit 1a of the upper portion of the camera, a shutter button 7 as an activation switch for starting photography, a main-operation dial 8 for setting a shutter speed and lens aperture value in accordance with the mode of operation during photography, and operation mode setting buttons 10 are arranged on the upper surface of the camera. A portion of the operation results of the buttons and dial is displayed on an LCD display panel 9. The shutter button 7 is composed such that SW1 (7a in FIG. 3) is turned ON with the first stroke, and SW2 (7b in FIG. 3) is turned ON with the second stroke. Also, the operation mode setting buttons 10 on the upper surface are used to set whether a single press of the shutter button 7 results in continuous shooting or a single photograph, and to set a self-photographing mode, etc., and the states of those settings are displayed on the LCD display panel 9.

There is a flash unit 11 that pops up from the camera main body 1, a hot shoe 12 for attaching a flash, and a flash contact point 13 in the center of the upper portion of the camera, and a mode setting dial 14 is provided on the upper portion opposite to the grip unit 1a of the camera main body 1.

An openable and closable external terminal cover 15 is provided on a side surface opposite to the grip unit 1a, and a video signal output jack 16 and USB connector 17 are housed inside when the external terminal cover 15 is opened.

In FIG. 2, a view eyepiece finder 18 is provided on the upper portion of the rear surface of the camera main body 1, and a color LCD monitor 19 which displays an image and a UI screen is further provided near the center of the rear surface. A sub-operation dial 20 arranged alongside the color LCD monitor 19 plays a supplemental role of the function of the main-operation dial 8, and is used to set the amount of exposure compensation for the proper exposure value calculated by an automatic exposure device in, for example, the AE mode of the camera. In a manual mode in which the user sets each of the shutter speed and lens aperture value at will, the shutter speed is set using the main-operation dial 8, while the lens aperture value is set using the sub-operation dial 20. This sub-operation dial 20 is also used for display selection of a photographed image displayed on the color LCD monitor 19. Furthermore, this sub-operation dial 20 is also used for menu item selection and setting of parameters, selection of the number of frame blocks (scenes) displayed during RecReview immediately after photography of a moving image, and the like. Reference numeral 43 denotes a main SW for activating or terminating operation of the camera. Reference numeral 44 denotes a menu button, reference numeral 45 denotes a moving image photographing start button, and reference numeral 46 denotes a set button. It is possible to display or not display a menu screen on the color LCD monitor 19 by turning the menu button 44 on or off. Also, when the moving image photographing start button 45 is pressed once in an awaiting photography state, photographing and recording of a moving image is started, and when it is pressed again during moving image photographing, the photographing and recording of the moving image is terminated. Also, the set button 46 is used for menu item selection during menu screen display, parameter determination, and the like. A playback button 47 is used to switch the camera main body (hereinafter, camera) 1 to the playback mode.

FIG. 3 is a block diagram describing the principal electrical composition of the single-lens reflex camera according to the present embodiment. Moreover, portions common with the aforementioned diagrams are indicated by the same reference numerals.

Reference numeral 100 denotes a central processing unit (hereinafter, MPU) of a microcomputer built into the camera main body 1. The MPU 100 performs operation control of the camera, and executes various processing and instructions for each element. An EEPROM 100a is built into the MPU 100, and can store time information of a timer circuit 109 and other information. A mirror driving circuit 101, focusing circuit 102, shutter driving circuit 103, video processing circuit 104, switch sensing circuit 105, and metering circuit 106 are connected the MPU 100. An LCD driving circuit 107, battery check circuit 108, the timer circuit 109, power supply circuit 110, audio input circuit 111, audio output circuit 112, and luminance detection circuit 113 are also connected. These circuits operate under the control of the MPU 100.

Also, the MPU 100 communicates with a lens control circuit 201 arranged inside the photographing lens unit through the mount contact point 21. When the photographing lens unit is attached to the main body 1, the mount contact point 21 also has a function of sending a signal to the MPU 100. Through this, it is possible for the lens control circuit 201 to perform communication with the MPU 100, and drive the photographing lens 200 and aperture 204 in the photographing lens unit through an AF driving circuit 202 and aperture driving circuit 203. Moreover, although the photographing lens is shown as a single photographing lens for convenience in the present embodiment, it is actually comprised of a group of multiple lenses.

The AF driving circuit 202 has, for example, a stepping motor, and adjusts the focus of the photographing light flux onto the image sensor 33 by changing the position of the focus lens of the photographing lens 200 under the control of the lens control circuit 201. The aperture driving circuit 203 has, for example, an auto iris function or the like, and obtains an optical aperture value by changing the aperture 204 under the control of the lens control circuit 201. The quick return mirror (main mirror) 6 directs the photographing light flux passing through the photographing lens 200 to the pentaprism 22, and also allows a portion thereof to pass through to a sub mirror 30. The sub mirror 30 directs that passing photographing light to a focus detection sensor unit 31. The mirror driving circuit 101 drives the main mirror 6 such that the main mirror 6 moves to a position which allows the photographic subject to be viewed, and a position in which it is sheltered from the photographing light flux. It also drives the sub mirror 30 such that it moves to a position in which it directs the photographing light flux to the focus detection sensor unit 31, and a position in which it is sheltered from the photographing light flux. Specifically, the mirror driving circuit 101 is provided with, for example, a DC motor and gear train, etc. The focus detection sensor unit 31 is a well-known phase-difference type sensor unit comprised of a field lens and reflection mirror arranged near an image-forming surface, and a secondary image-forming lens, aperture, and plurality of line sensors such as CCDs or the like. A signal output from the focus detection sensor unit 31 is supplied to the focusing circuit 102, and after being converted to a photographic subject signal, is sent to the MPU 100. The MPU 100 executes focus detection calculation by a phase-difference detection method based on the photographic subject signal. Then, the defocus amount and defocus direction are obtained, and based on these, the focus lens of the photographing lens 200 is driven to an in-focus position by the lens control circuit 201 and AF driving circuit 202.

The pentaprism 22 is an optical member that reflects and converts the photographing light flux reflected by the main mirror 6 to an upright image. The user can therefore view the photographic subject through the view eyepiece finder 18. This pentaprism 22 also directs a portion of the photographing light flux to a photometer 370. The metering circuit 106 obtains an output from the photometer 370, converts it to a luminance signal for each area on the viewed surface, and outputs it to the MPU 100. The MPU 100 calculates an exposure value based on the luminance signal obtained from the metering circuit 106.

A mechanical focal plane shutter 32 blocks the photographing light flux when the user is viewing the photographic subject through the view eyepiece finder 18. Also, the desired exposure time during photography is obtained by the time difference between the travel of a front curtain blade and a rear curtain (both not shown) based on a release signal. This focal plane shutter 32 is controlled by the shutter driving circuit 103 in accordance with a command from the MPU 100.

A CMOS, which is an imaging device, is used in the image sensor 33. There are various configurations for the imaging device such as a CCD type, CMOS type, CID type, etc., and an imaging device of any of these configurations can be adopted. A clamp/CDS (correlation double sampling) circuit 34 executes basic analog processing before A/D conversion, and can also change the clamp level. An AGC (automatic gain control) 35 executes basic analog processing before A/D conversion, and can also change the AGC basic level. An A/D converter 36 converts an analog signal from the image sensor 33 to a digital signal.

An optical low pass filter 410 is comprised of a plurality of layered and adhered birefringent plates made from liquid crystal and phase plates, and further by an adhered infrared cut filter. An imaging unit 400 includes the optical low pass filter 410 and the image sensor 33 as a unit.

The video processing circuit 104 executes general hardware image processing such as gamma/knee processing, filter processing, information combination processing for monitor display, etc., on digitized image data. Image data for monitor display output from the video processing circuit 104 is displayed on the color LCD monitor 19 through the color LCD driving circuit 120. Also, the video processing circuit 104 can save image data in a buffer memory 37 (second storage unit) through a memory controller 38 in accordance with the instructions of the MPU 100. Furthermore, the video processing circuit 104 also has a function of executing image data compression processing such as JPEG. In the case of continuous photography, image data is stored once in the buffer memory 37, and unprocessed image data can be sequentially read out through the memory controller 38. Thus, the video processing circuit 104 can sequentially execute image processing or compression processing regardless of the speed at which image data is input from the A/D converter 36. The memory controller 38 stores image data input from an external interface 40 (corresponds to the video signal output jack 16 and USB connector 17 in FIG. 1) in the memory 39 (first storage unit). It also has a function of outputting image data stored in the memory 39 to the external interface 40. Moreover, the memory 39 is a non-volatile memory such as, for example, a memory card, and can freely be inserted and removed from the camera main body 1 by a mechanism such as the card slot shown in the attached diagrams.

The switch sensing circuit 105 sends an input signal to the MPU 100 based on the operation state of each of switches, buttons and dials. Reference numeral 7a denotes a switch SW1 that is turned on by a first stroke of the release button 7.

Reference numeral 7b denotes a switch SW2 that is turned on by a second stroke of the release button 7. In the present embodiment, when the main SW 43 is operated and electric power is supplied to the camera 1, the MPU 100 controls each unit (element), and switches the camera 1 to an awaiting photography state (photography mode). When the switch SW2 is turned on in this awaiting photography state, an instruction to start photography is sent to the MPU 100. Then, the MPU 100 controls each unit to photograph data of one still image, perform the aforementioned processing, and store it in the memory 39, in accordance with the depression of the SW2. Moreover, in the present embodiment, still image data recorded by one photography instruction by the SW2 is recorded in the memory 39 as one still image file.

Also, the aforementioned main-operation dial 8, sub-operation dial 20, mode setting dial 14, main SW 43, menu button 44, moving image photographing start button 45, and set button 46 are connected. It is possible to display or not display a menu screen on the color LCD monitor 19 by turning this menu button 44 on or off.

In the photography mode, when the moving image photographing start button 45 is depressed and an instruction to start moving image recording is given, the MPU 100 starts photography of moving image data, and starts recording of moving image data into the memory 39. Also, when an instruction to stop photography of moving image is given, photography and recording of moving image data to the memory 39 are stopped. Moreover, in the present embodiment, a string of moving image data recorded in the memory 39 during the time period between the instruction to start moving image photography and the instruction to stop moving image photography is managed as a single moving image file. Moreover, details of the photographic operation of the moving image will be described later.

Also, the set button 46 is used to select menu items when the menu screen is displayed, and determine parameters, etc.

The LCD driving circuit 107 executes display drive of the external LCD panel 9 and a finder LCD 41 in accordance with instructions from the MPU 100. The battery check circuit 108 performs a battery check at a predetermined time period in accordance with a signal from the MPU 100, and sends that detection result to the MPU 100. A power supply unit 42 supplies the electric power to each element of the camera. The timer circuit 109 measures the time period between when the main SW 43 is turned off until the main SW 43 is next turned on as well as the date, and sends the measurement result to the MPU 100 in accordance with a command from the MPU 100. A microphone 50 has a function of inputting sound when a moving image is photographed. A speaker 51 has a function of outputting sound when playback of a moving image is performed on the single-lens reflex camera of the present embodiment. A luminance sensor 52 detects the luminance value of the photographic subject.

Also, when the playback button 47 is depressed by the user in a state in which the electric power is supplied (power on state), the MPU 100 controls each unit, and switches the camera 1 to the playback mode for playing back a recorded moving image.

When the mode of the camera is switched to the playback mode, the MPU 100 controls the memory controller 38, plays back one from among some items of image data recorded in the memory 39, processes the image data using the video processing circuit 104, and displays an image on the monitor 19. Although the image played back at this time may be a still image or moving image, for example, in the case that the mode is switched to the playback mode immediately after a still image or moving image is photographed in the photography mode, the still image or moving image photographed immediately before is played back and displayed.

Figure 4:
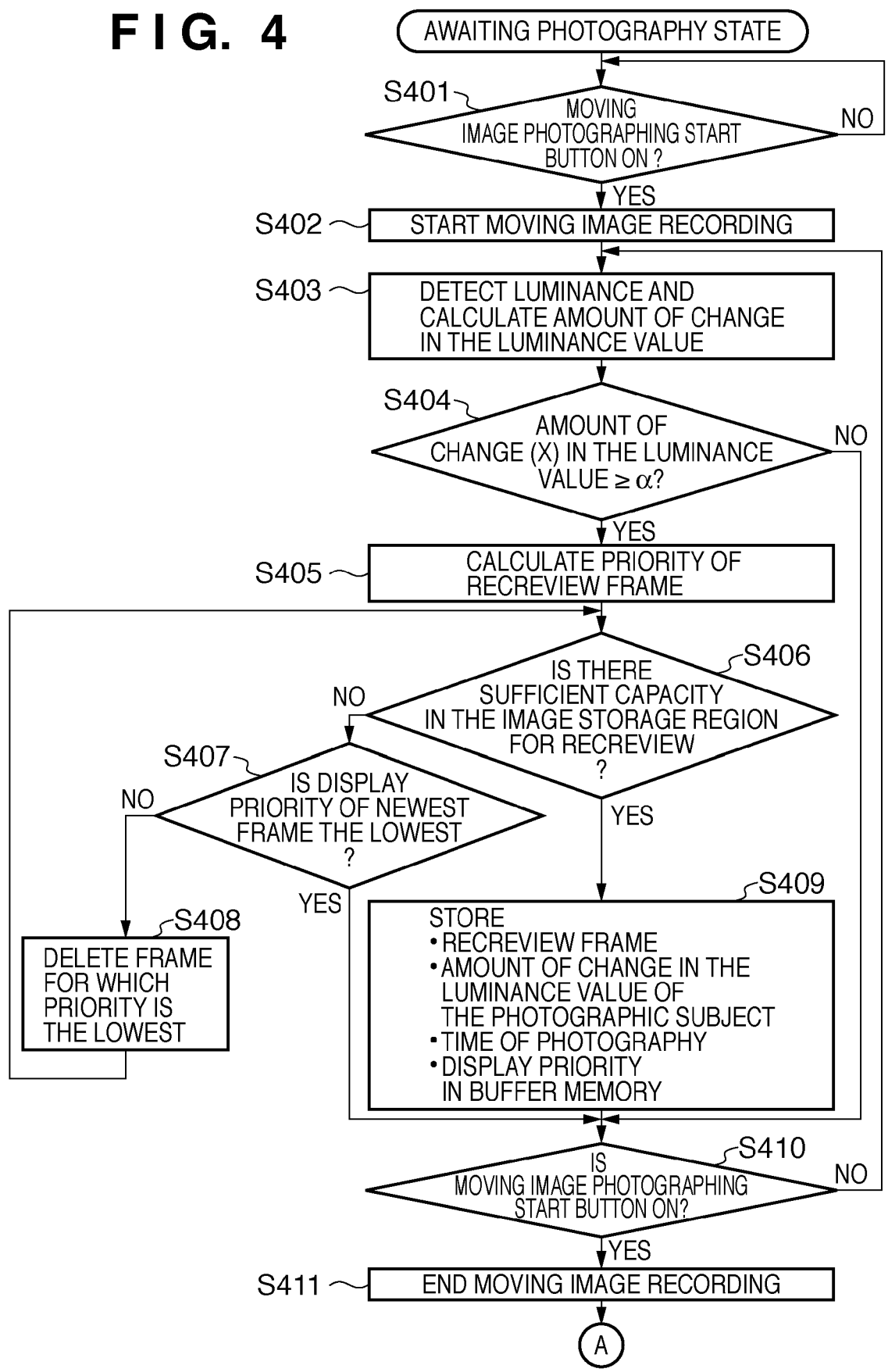
FIG. 4 is a flowchart describing a storage method of image data for confirmation display (RecReview) immediately after photographing a first moving image in the camera according to the embodiment of the present invention.

FIG. 4 is a flowchart describing extraction (review image extraction) of image data for confirmation display (RecReview) immediately after photography of a first moving image and storage processing in the camera according to the embodiment of the present invention. A program that executes this processing is stored in a ROM 100b of the microcomputer (MPU) 100, and the MPU 100 executes the control processing in accordance with the program.

This processing is started when the main SW 43 of the camera is turned on, and in the awaiting photography state, it is determined in step S401 whether or not the moving image photographing start button 45 has been pressed. If it is determined that the moving image photographing start button 45 has been pressed, the state of the camera becomes a moving image photography state, the process advances to step S402, and photography of a moving image and recording processing are started. In this moving image photography state, the quick return mirror 6 is moved up and the shutter 32 is opened such that an optical image is formed on the image sensor 33. Also, in the moving image photography, an analog signal output from the image sensor 33 at a predetermined frame rate is converted to a digital signal by the A/D converter 36, predetermined pixel interpolation processing and color conversion processing are executed by the video processing circuit 104, and the photographed moving image data is written to the buffer memory 37. The moving image data thus written in the buffer memory 37 is read out again, converted to image data for display by the video processing circuit 104, and displayed on the color LCD monitor 19 through the color LCD driving circuit 120. In this way, a state of the color LCD monitor 19 moves to a state of live view display (electronic view finder). On the other hand, if it is determined in step S401 that the moving image photographing start button 45 has not been pressed, the state returns to the awaiting photography state, and the step S401 is repeated. In moving image recording process of step S402, the MPU 100 records image data written in the buffer memory 37 into the memory 39 through the memory controller 38. Also, when the recording of the moving image starts, the audio input circuit 111 encodes audio data input from the microphone 50, and temporarily saves the encoded audio data in the buffer memory 37. The data amounts of the thus temporarily saved encoded moving image data and encoded audio data increase with the elapse of time. Therefore, the MPU 100 forms the encoded data in a predetermined file format, associates it with the moving image data and writes the file to the memory 39.

Figure 5:
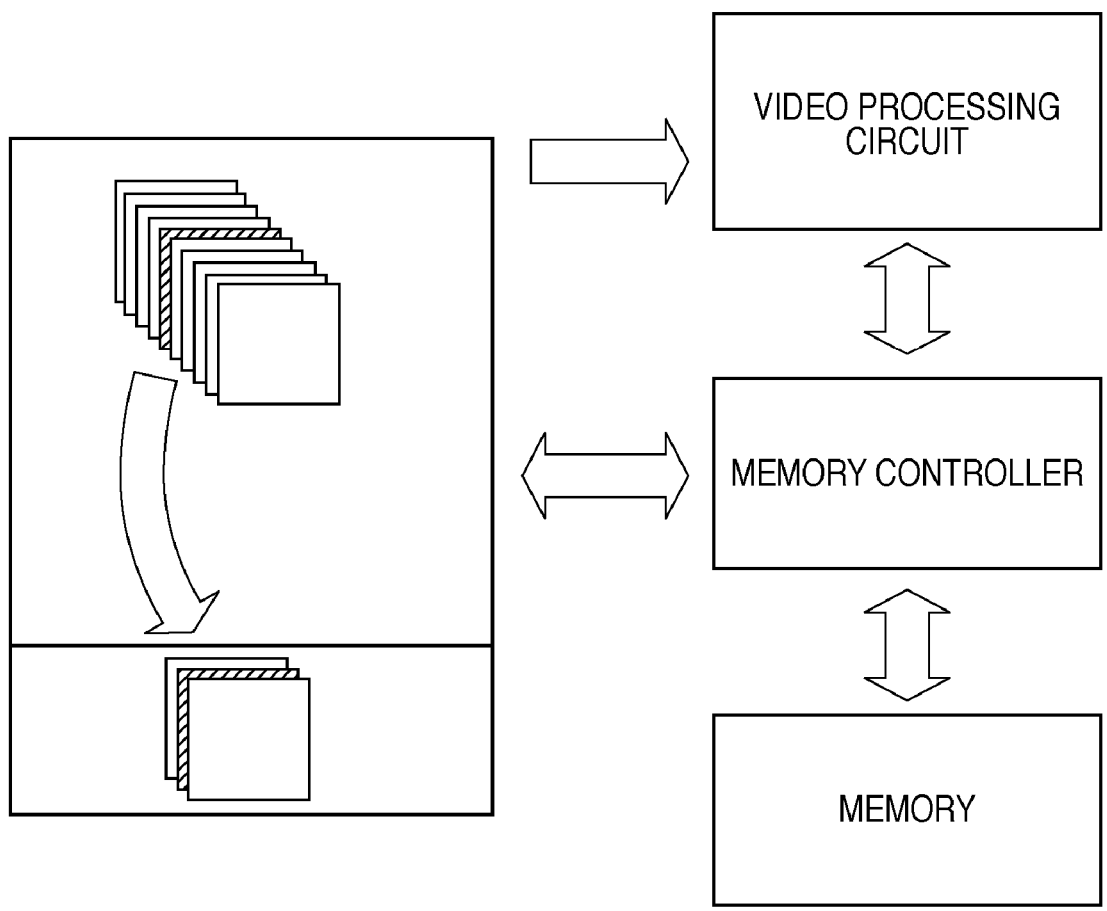
FIG. 5 is a block diagram describing image processing that extracts a frame block (scene) for RecReview from image data according to the present embodiment.

FIG. 5 is a block diagram describing image processing that extracts a frame for RecReview from moving image data according to the present embodiment.

A temporary writing region 371 for recording moving image data and still image data, and an image data recording region 372 for RecReview are provided in the buffer memory 37. Here, after image data for RecReview is temporarily written in the temporary writing region 371, the image data for RecReview is stored in the image data recording region 372 for RecReview separately from the data to be stored in the memory 39.

Also, in the present embodiment, the size of the image data of each frame extracted as an image signal for RecReview is reduced to the same number of pixels as the display size (number of pixels) of the LCD monitor 19 by the video processing unit 104, regardless of the size of the photographed moving image. The image data of each reduced size of frame is then compressed by the JPEG method and stored in the buffer memory 37.

Also, there is a limit to the storage capacity of the memory 37. For this reason, the number of frames of the image signal for RecReview that can be stored in the memory 37 during photography of a moving image is determined by the amount of data of each frame stored in the memory 37.

Returning to FIG. 4, when recording of moving image data is started in step S402, the process advances to step S403, the luminance value of the photographic subject is detected by the luminance sensor 52 every predetermined period of time, and the luminance value is input to the MPU 100 through the luminance detection circuit 113. The MPU 100 calculates the amount X of change in the luminance value of the photographic subject between the current frame and the immediately preceding frame.

Advancing to the next step S404, the MPU 100 compares the amount X of change in the luminance value of the photographic subject obtained in step S403 with a threshold value α. Although this threshold value α is stored in advance in the EEPROM 100a, a composition in which the user is able to change it is also possible. Here, if it is determined that the luminance value of the photographic subject has changed in an amount equal to or greater than the predetermined threshold value α with respect to the immediately preceding frame (X≧α), the process advances to step S405. In step S405, the amount X of change in the luminance value of the current frame is compared with the values of X of the RecReview frames already stored in the buffer memory 37. Then, the display priority of the RecReview frames is calculated based on the comparison result, and the display priority during RecReview is determined for all RecReview frames stored in the buffer memory 37. Moreover, here, a greater amount X of change in the luminance value of the photographic subject results in a higher display priority.

Next, the process advances to step S406, and it is determined whether or not sufficient capacity to store the RecReview frame remains in the image data storage region 372 for RecReview in the buffer memory 37. Here, if it is determined in step S406 that sufficient capacity remains, the process advances to step S409, and the (newest frame) RecReview frame for which the luminance value of the photographic subject changed in an amount equal to or greater than the predetermined threshold α is stored in the image data storage region 372 in the buffer memory 37 for RecReview separately from the image data. Moreover, the storage operation to the buffer memory 37 is done by the MPU 100 and video processing circuit 104. Also the time at which the frame was photographed, the amount X of change in the luminance value of the photographic subject with respect to the immediately preceding frame, and the display priority are associated with the frame stored in the image data storage region 372 for RecReview and stored in the buffer memory 37.

On the other hand, in step S406, if it is determined that the sufficient storage capacity to store the RecReview frame does not remain in the buffer memory 37, and the process advances to step S407. Then, it is determined in step S407 whether or not the display priority of the newest frame for which the amount X of luminance change was obtained in step S404 is the lowest of the priorities of the frames stored in the buffer memory 37. In step S407, if it is determined that the display priority of the newest frame is the lowest the process advances to step S410, and the recording of moving image data is continued without storing the newest frame as RecReview frame in the buffer memory 37.

On the other hand, in step S407, if it is determined that the display priority of the newest frame is not the lowest, the process advances to the update processing of step S408. In step S408, the frame for which the display priority is the lowest, that is, the amount X of change in the luminance is the lowest, is deleted from among the RecReview frames stored in the buffer memory 37, and the process advances to step S406. Then, in step S406, it is determined whether or not the remaining capacity of the image data storage region 372 for RecReview is insufficient, and if the remaining capacity is still insufficient, the process advances to step S407, and the operation of step S407 and step S408 is repeated, while if in step S406 the remaining capacity has become sufficient the process advances to step S409, and the frame for which the amount X of change was determined to be equal to or greater than the predetermined threshold value α in step S405 is stored as a RecReview frame into the image data storage region 372.

Furthermore, in step S404, if it is determined that the amount X of change in the luminance value of the photographic subject is less than the predetermined threshold value α (X<α), the process advances to step S410 since this is not a RecReview frame in this case, and it is determined whether or not the moving image photographing start button 45 has been pressed. Here, in the case that the moving image photographing start button 45 has not been pressed, the process advances to step S403 to continue moving image photographing and recording. On the other hand, if the moving image photographing start button 45 has been pressed in step S410, the process advances to step S411 since this is an instruction to end moving image photography, and recording operation of the moving image is ended. RecReview after this completion of moving image recording will be described later with reference to FIG. 7.

Next, a method of extracting and storing image data for RecReview according to another embodiment of the present invention will be explained with reference to the flowcharts in FIGS. 8A and 8B.

Figure 8A:
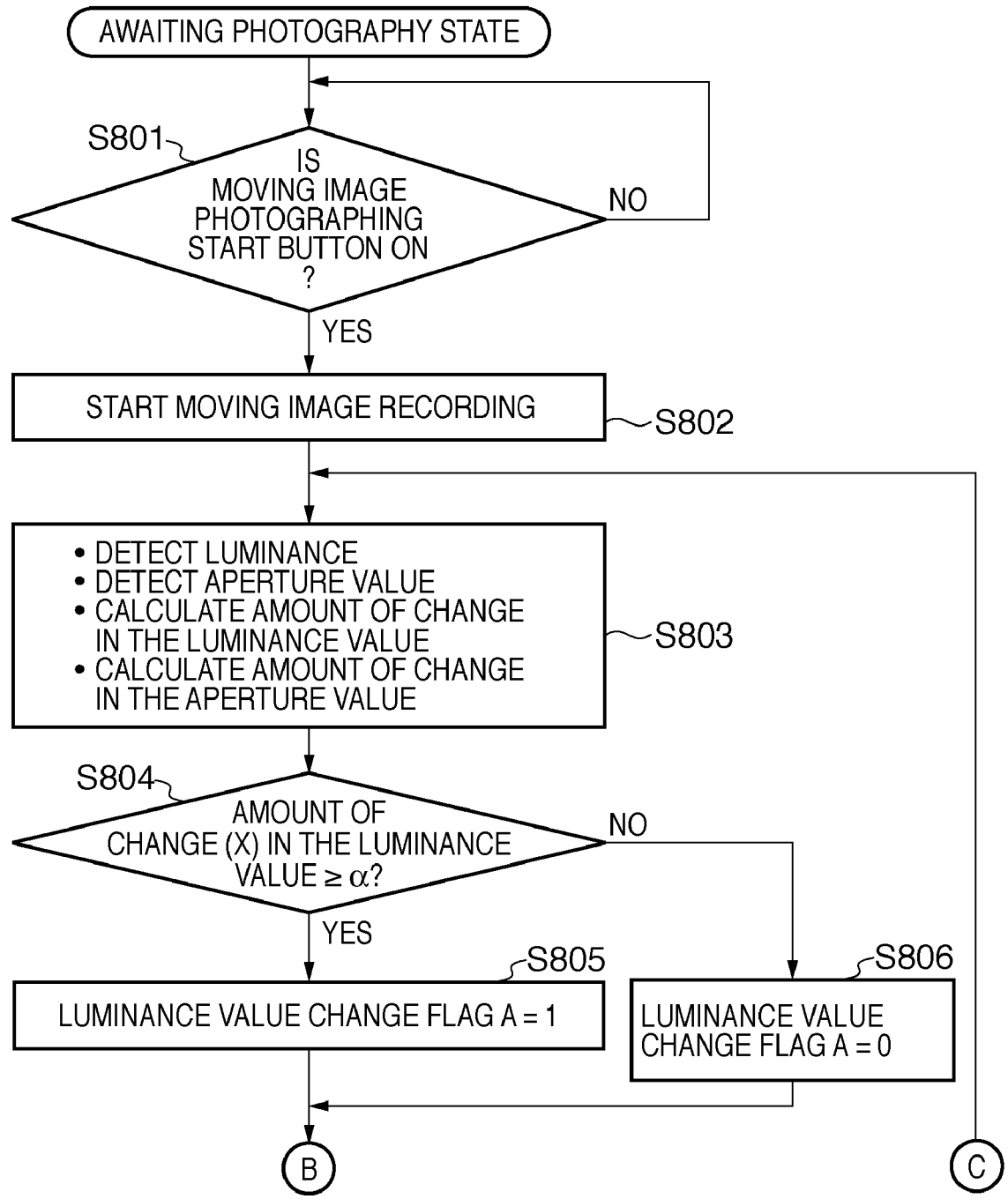
FIGS. 8A and 8B are flowcharts describing another storage method of image data for confirmation display immediately after photographing a moving image in the camera according to the embodiment of the present invention.
Figure 8B:
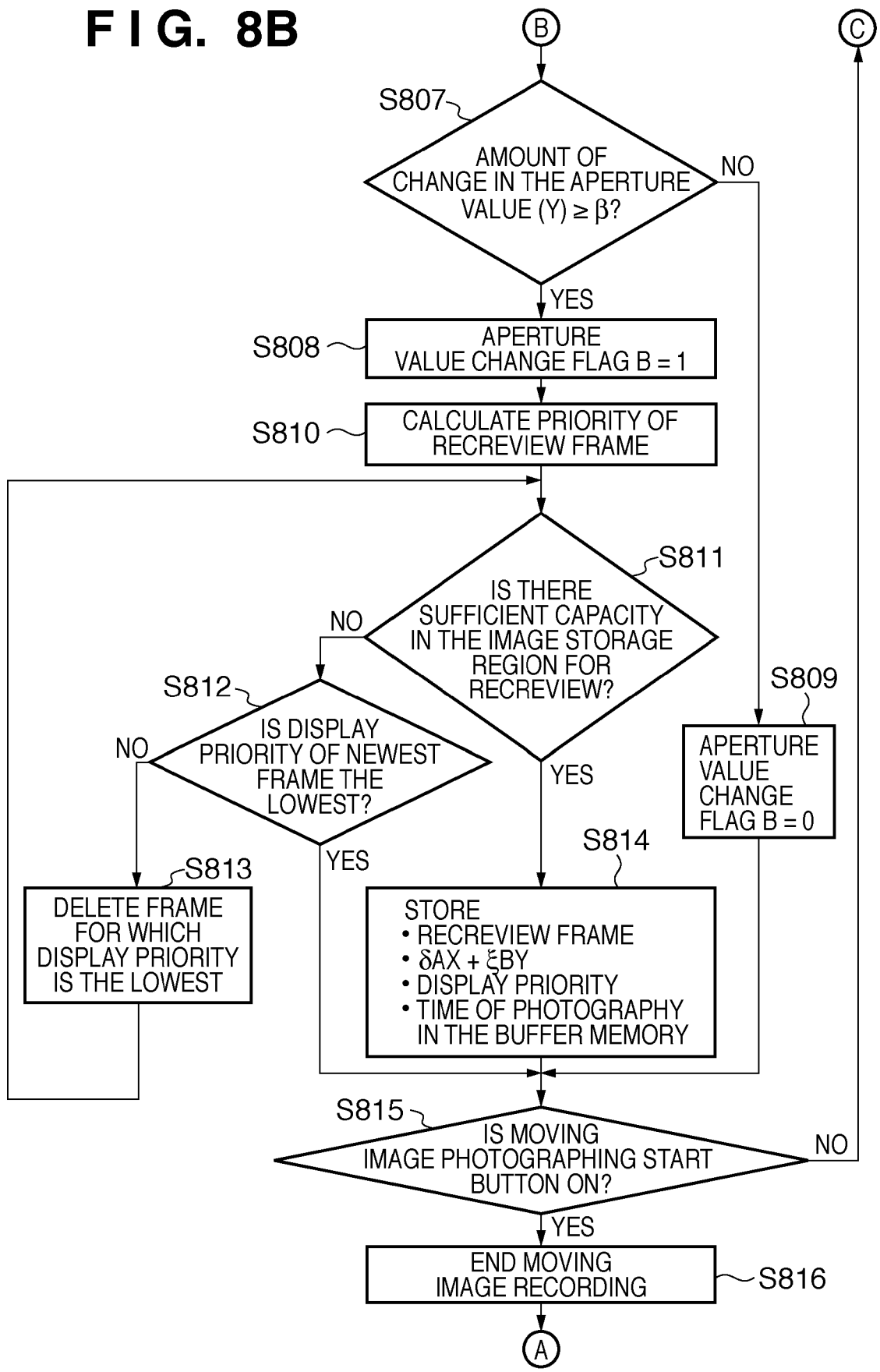

FIGS. 8A and 8B are flowcharts describing processing that extracts (review image extraction) and stores image data for RecReview in the photographing device according to another embodiment of the present invention. A program that executes this processing is stored in the ROM 100b of the microprocessor (MPU) 100, and the MPU 100 executes control processing in accordance with this program.

This processing is started when the main SW 43 of the camera is turned on, and in an awaiting photography state, it is determined in step S801 whether or not the moving image photographing start button 45 has been pressed. Here, if the moving image photographing start button 45 has been pressed, the state moves to a moving image photography state and the process advances to step S802, and moving image photography and recording processing are started. In this moving image photography state, the photographed moving image data is written to the buffer memory 37, and also displayed on the color LCD monitor 19 through the color LCD diving circuit 120, similarly to the case of the aforementioned step S402 in FIG. 4. On the other hand, in the case that the moving image photographing start button 45 has not been pressed in step S801, the state returns to the awaiting photography state, and detection process of the moving image photographing start button 45 is repeated. Moreover, in step S802, an operation that encodes audio data input from the microphone 50 and temporarily saves that encoded audio data in the buffer memory 37 is also executed, similarly to the aforementioned step S402.

When moving image data recording is thus started in step S802, the process advances to step S803, the luminance value of the photographic subject is detected by the luminance sensor 52 every predetermined period of time, and the luminance value is input to the MPU 100 through the luminance detection circuit 113. The MPU 100 calculates the amount X of change in the luminance value of the photographic subject between the current frame and the immediately preceding frame. Also, the change in the aperture value of the photographing lens 200 is also detected in step S803, unlike the aforementioned step S403. There is a case in which the user changes the aperture value by a predetermined operation, and a case in which the camera itself automatically changes the aperture value to accommodate a change in the amount of light or the like, and both of these are detected in step S803. To change the aperture value, the aperture driving circuit 203 receives a signal from the MPU 100 through the lens control circuit 201 and drives the aperture 204. Therefore, the MPU 100 itself can make the determination of whether or not the aperture value has changed. Furthermore, the MPU 100 also calculates the amount Y of change from the previous aperture value.

Next, the process advances to step S804, and the MPU 100 compares the amount X of change in the luminance value of the photographic subject obtained in step S803 with a threshold value $\alpha$. Although this threshold value $\alpha$ is stored in advance in the EEPROM 100a, a composition in which the user is able to change it is also possible. Here, if it is determined in step S804 that the luminance value of the photographic subject has changed in an amount equal to or greater than the predetermined threshold value $\alpha$ with respect to the immediately preceding frame ($X \geq \alpha$), the process advances to step S805. In step S805, the value of a "luminance value change flag A" is set to "1", and the process advances to step S807. On the other hand, if it is determined in step S804 that the amount of change X is smaller than the threshold value $\alpha$, the process advances to step S806, the value of the "luminance value change flag A" is set to "0", and the process advances to step S807 (FIG. 8B).

In step S807, the amount Y of change of the aperture value and a threshold value $\beta$ are compared. The amount Y of change in the aperture value is determined by the MPU 100. Although the threshold value $\beta$ of the amount of change in the aperture value is stored in advance in the EEPROM 100a, a composition in which the user is able to change it is also possible. If it is determined in step S807 that the aperture value has changed in an amount equal to or greater than the predetermined threshold $\beta$ with respect to the immediately preceding aperture value ($Y \geq \beta$), the process advances to step S808, the value of an "aperture value change flag B" is set to "1", and the process advances to step S810. On the other hand, if it is determined in step S807 that the aperture value has not changed in an amount equal to or greater than the predetermined threshold $\beta$ with respect to the immediately preceding aperture value ($Y < \beta$), the process advances to step S809, the value of the "aperture value change flag B" is set to "0", and the process advances to step S815. Moreover, the flags A and B are set in the RAM (not shown) of the MPU 100 or in the buffer memory 37.

Next, the process advances to step S810, and the MPU 100 calculates the amount of scene change $\Delta S$ of the frame in Expression (1).

$$\Delta S = \delta AX + \xi BY, \quad \delta + \xi = 1 \quad \text{(Expression (1))}$$

Here, $\delta$ and $\xi$ are weighting factors corresponding to the change in the luminance value of the photographic subject and the change in the aperture value of the lens, respectively. A and B are respectively values of the flags A and B.

Here, a frame that satisfies at least one of the condition that the amount X of change in the luminance value of the photographic subject is equal to or greater than the threshold value $\alpha$ and the condition that the amount Y of change in the aperture value is equal to or greater than the threshold value $\beta$ is compared with those of RecReview frames already stored in the buffer memory 37. The amount of scene change $\Delta S$ between frames is compared, and the display priority of each of the RecReview frames is calculated. The display priority during RecReview is thus determined for all RecReview frames stored in the buffer memory 37.

Moreover, a larger value for the amount of scene change $\Delta S$ results in a higher display priority. Also, although the values of the weighting factors $\delta$ and $\xi$ corresponding to the amount X of change of the luminance value of the photographic subject and the amount Y of change in the aperture value are stored in advance in the EEPROM 100a, a composition in which the user can change these is also possible.

Next, the process advances to step S811, and it is determined whether or not sufficient capacity to store the RecReview frame remains in the image data storage region 372 of the buffer memory 37. Here, if it is determined that the sufficient capacity remains, the process advances to step S814. In step S814, a frame that satisfies at least one of the condition that the amount X of change in the luminance of the photographic subject is equal to or greater than the threshold value $\alpha$ and the amount Y of change in the aperture value is equal to or greater than the threshold value $\beta$ is stored in the image data storage region 372 for RecReview in the buffer memory 37, separately from the photographed image. Storage in this buffer memory 37 is carried out by the MPU 100 and video processing circuit 104. Also, the amount of scene change $\Delta S$, display priority, and time of photography of the frame are associated with the frame stored in the image data storage region 372 for RecReview and stored in the buffer memory 37.

Furthermore, if it is determined in step S811 that the sufficient capacity to store the RecReview frame does not remain in the buffer memory 37, the process advances to step S812. In step S812, it is determined whether or not the display priority of the newest frame determined in step S810 is the lowest among those of the RecReview frames stored in the buffer memory 37. If it is determined whether or not the display priority of the newest frame is the lowest in step S812, the process advances to step S815, the newest frame is not stored as the RecReview frame in the buffer memory 37, and recording of photographed moving image data is continued.

Furthermore, if the display priority of the newest frame determined in step S810 is not the lowest in step S812, the process advances to step S813. The frame for which the display priority is the lowest from among the RecReview frames stored in the buffer memory 37 is deleted from the buffer memory 37 in step S813, and the process advances to step S811. Then, in step S811, if it is determined that the remaining capacity in the image data storage region 372 is not sufficient, the operation of step S812 and step S813 is repeated until capacity to store the newest frame is secured.

When any of steps S809, S812 or S814 is thus executed, the process advances to step S815. In step S815, it is determined whether or not the moving image photographing start button 45 has been pressed. If the moving image photographing start button 45 has not been pressed, the process advances to step S803, and the photographing and recording of moving image data are continued. On the other hand, if the moving image photographing start button 45 has been pressed in step S815, the process advances to step S816, and the operation of photographing and recording of moving image data is ended.

Moreover, here, the image data for RecReview is created by a method similar to that of the aforementioned image data for live view display. Hereinafter, a detailed explanation will be given with reference to FIG. 5.

Frames 2004 to 2006 for which the luminance value X of the photographic subject has changed in an amount equal to or greater than the threshold value α or the aperture value Y has changed in an amount equal to or greater than the threshold value β are re-read out from among image data written to the temporary writing region 371 in the buffer memory 37 during moving image photography. Then, the frames are converted to image data for display in the video processing circuit 104, and stored as RecReview image data in the image data storage region 372 in the buffer memory 37. Here, the storage of the image data for RecReview is carried out in parallel with the recording of moving image data to the memory 39.

Moreover, although the image data for RecReview is stored in the buffer memory 37 in the present embodiment, a composition in which the image data for RecReview may be stored in the memory 39.

The RecReview image data thus created by the processing according to the flowchart in FIG. 4 or FIGS. 8A and 8B is read out from the buffer memory 37 immediately after completion of the moving image photography. It is then displayed on the color LCD monitor 19 through the MPU 100, the video processing circuit 104, and the color LCD driving circuit 120.

That is, the RecReview image data stored in the memory 37 in the aforementioned manner is automatically read out and displayed on the LCD monitor 19 after completion of the moving image photography when the camera is in the photography mode state. For this reason, there is no need for the user to operate the playback button 47 to switch the camera 1 to the playback mode after termination of photography of moving image.

Also, during moving image recording, frames at the start and at the end of moving image recording are stored in the buffer memory 37, regardless of the amount of change in the luminance value of the photographic subject or in the lens aperture value. In addition, a composition in which image data for RecReview is always generated for a photographed moving image even in a case in which a predetermined condition for creating RecReview image data is not satisfied is also possible.

Furthermore, although the amount of change in the luminance value of the photographic subject and in the lens aperture value were given as determination conditions for generation of RecReview image data in the present embodiment, the amount of change in the shutter speed, amount of zoom or the like may also be determination conditions for generation of RecReview image data.

Next, the method of selection of a frame displayed on the color LCD monitor 19 during RecReview will be explained with reference to FIG. 6.

Figure 6:
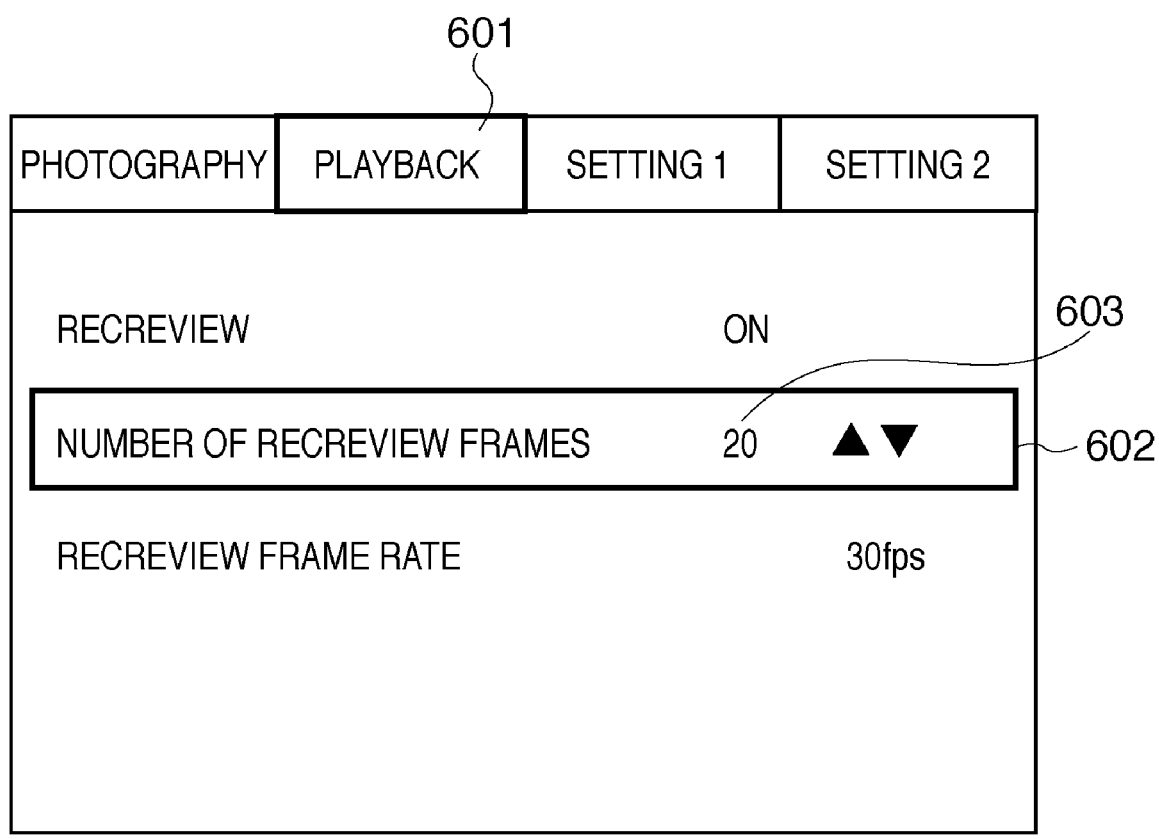
FIG. 6 depicts a view illustrating an example of an operation screen (UI screen) for executing RecReview settings in the camera according to the present embodiment.

FIG. 6 depicts a view illustrating an example of an operation screen (UI screen) for executing RecReview settings in the camera according to the present embodiment.

A menu screen is displayed on the color LCD monitor 19 when the menu button 44 is pressed, and it is possible to select a menu tab on the screen by rotating the main-operation dial 8 to the left or to the right. By rotating the sub-operation dial 20 to the left or right in a state in which the second from the left "playback tab" 601 is currently selected in FIG. 6, the cursor 602 moves to the second from the top "number of RecReview frames" item. A state in which "number of Rec-Review frames" is selected is then entered by pressing the set button 46. When the sub-operation dial 20 is rotated to the right in this state, the number of displayed RecReview frames 603 decreases, and the number of displayed RecReview frames 603 increases when it is rotated to the left. In FIG. 6, "20" is displayed as the number of RecReview frames to be displayed. It is possible to set the number of RecReview frames to be displayed on the color LCD monitor 19 by pressing the set button 46 in a state in which the number of frames 603 is thus set to a desired value. The number of RecReview frames to be displayed thus set is stored in the EEPROM 100a.

Similarly, by rotating the sub-operation dial 20 to the left or right in a state in which "playback tab" 601 is selected, and by moving the cursor 602 to the topmost "RecReview" item and pressing the set button 46, a state in which "RecReview" is selected is entered. By rotating the sub-operation dial 20 to the left or right in this state, "RecReview/non-RecReview" is switched, and by making a determination using the set button 46, it is possible to set whether or not RecReview is to be carried out after moving image photography.

Also, by setting the "RecReview frame rate" in FIG. 6, the user can set the frame rate (the number of updated display screens per unit time) of the RecReview images displayed on the LCD monitor 19 in RecReview display. RecReview image data is read out from the buffer memory 37 and displayed to match the frame rate set here during RecReview display.

Information set here is stored in the EEPROM 100a and the settings are saved even when the electric power is off, and the information is referred to in the processing illustrated in the flowcharts in FIG. 4, FIG. 7 and FIGS. 8A and 8B.

Moreover, in FIG. 6, although the number of RecReview frames is set, settings other than this such as, for example, playback time period (for example, seconds) of RecReview, may also be set.

Next, processing that displays the RecReview frames according to the number set in advance from among the RecReview frames stored in the buffer memory 37 on the color LCD monitor 19 after photographing of moving image is complete will be explained with reference to the flowchart in FIG. 7.

Figure 7:
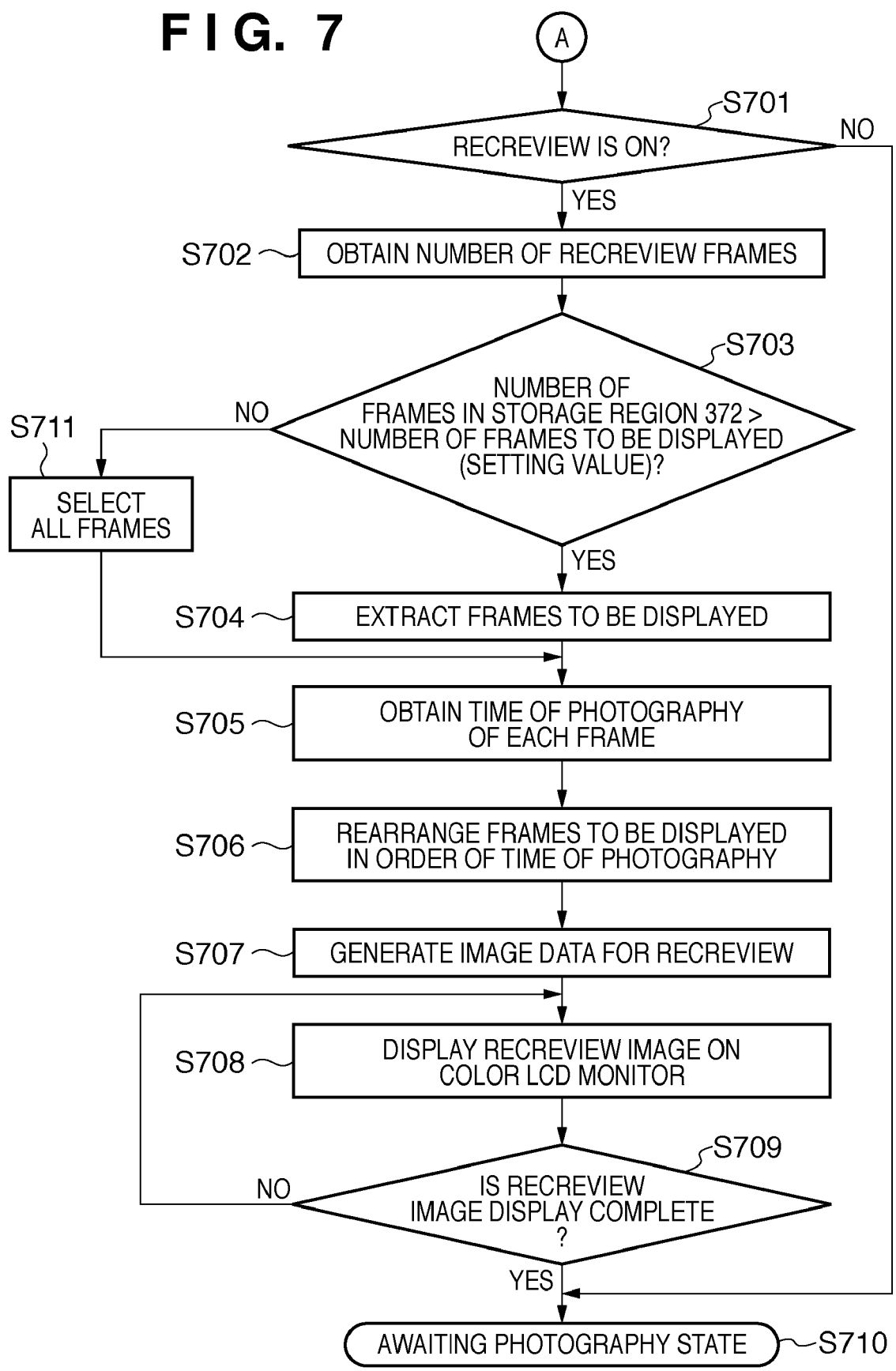
FIG. 7 is a flowchart describing RecReview processing in the camera according to the embodiment of the present invention.

FIG. 7 is a flowchart describing RecReview processing in the camera according to the embodiment of the present invention. A program that executes this processing is stored in the ROM 100b of the microcomputer (MPU) 100, and the MPU 100 executes control processing in accordance with the program.

This processing is started after photographing and recording of moving image data is ended in step S411 in FIG. 4 or in step S816 in FIG. 8B. Firstly, it is determined in step S701 whether or not the setting value in the EEPROM 100a explained in the aforementioned FIG. 6 is set to "RecReview is ON". Here, in the case that it is set to "RecReview is ON", the process advances to step S702 and RecReview processing is executed, and if not, the process advances to the standby state in step S710.

In step S702, the number of frames to be displayed (for example in FIG. 6, 20 scenes) is obtained from the setting value in the EEPROM 100a explained in FIG. 6. Next, the process advances to step S703, and the number of RecReview frames stored in the image data storage region 372 in the buffer memory 37 is compared with the number of frames to be displayed (for example, 20 scenes). Here, in the case that the number of RecReview frames stored in the image data storage region 372 is larger, the process advances to step S704, and executes of narrowing down of the frames to be displayed. On the other hand, in the case that the number of RecReview frames stored in the image data storage region 372 is the same or smaller in step S703, the process advances to step S711. In step S711, all RecReview frames stored in the image data storage region 372 are set to be RecReview displayed, and the process advances to step S705.

In step S704, the display priorities of the plurality of RecReview frames stored in the image data storage region 372 in the buffer memory 37 are determined. Frames are then extracted in the set number (20 scenes) in order of highest display priority.

Next, the process advances to step S705, and the photography time information that represents the time at which the frame extracted in step S704 or selected in step S711 was photographed is obtained from the buffer memory 37. Next, the process advances to step S706, and the frames to be displayed stored in the buffer memory 37 are rearranged in order of time information of photography. The process then advances to step S707, RecReview image data is generated from the frames rearranged in order of time information of photography in step S706, and stored in the buffer memory 37. Next, the process advances to step S708, and the RecReview image data is read out from the buffer memory 37 and displayed on the color LCD monitor 19 through the MPU 100, video processing circuit 104, and color LCD driving circuit 120. Next, in step S709, it is determined whether or not RecReview is complete, and if it is determined the RecReview is complete, then the process returns to the awaiting photography state in step S710. On the other hand, if it is determined that RecReview is not complete, the process advances to step S708, and the RecReview image data is read out from the buffer memory 37 and displayed.

Moreover, because a continuity between RecReview frames is not expected in RecReview, audio output from the speaker 51 is not executed in RecReview of the present embodiment. However, sound (date and time of photography, location, etc.) associated with the RecReview frames may be output from the speaker 51 during RecReview.

In the case that the number of RecReview frames is "20" and the frame rate is "30 fps" as in the example of the aforementioned FIG. 6, for example, 20 scenes may be displayed at a frame rate of "30 fps" in step S708 in FIG. 7. Alternatively, only one scene may be displayed as RecReview frame in step S708, and steps S708 and S709 may be repeated 20 times to display 20 scenes at a frame rate of "30 fps".

As explained above, according to the present example, it is possible to automatically select a RecReview frame based on predetermined conditions (amount of change in the luminance value of the photographic subject, amount of change in the lens aperture value, amount of change in the shutter speed, amount of change in the zoom value). By this, it is possible to automatically select a scene change (important scene) during photography of moving image to be a RecReview frame.

Also, it is possible to set in advance the number of frames to be actually displayed as RecReview from the RecReview frames stored in the buffer memory.

Furthermore, because the frames to be actually displayed as RecReview are associated with a ranking in accordance with the display priority calculated from a predetermined condition, the scenes (frames) with high importance that the user wishes to confirm can be adopted as RecReview images.

Also, detailed confirmation of a moving image can be done by setting the number of frames to be displayed as RecReview selected in advance to be large, while brief confirmation can be done by setting it to be small, and convenience of operation can be obtained.

Also, although a number of RecReview frames corresponding to the capacity of the buffer memory are stored in the present embodiment, a number of frames set by the number of RecReview frames on the UI screen in FIG. 6, for example, may also be stored in the buffer memory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-235588, filed Sep. 12, 2008, which is hereby incorporated by reference herein in its entirety.

What is claimed is:

1. An imaging apparatus comprising:
   an image sensing unit;
   a recording unit that records moving image data obtained by the image sensing unit in a storage medium;
   an extraction unit that extracts a frame of a portion of the moving image data in accordance with a predetermined condition during recording operation of the moving image data by the recording unit, and stores image data of the extracted frame for confirmation display in a memory;
   a setting unit that sets a number of frames of the image data to be read from the memory for confirmation display; and
   a review unit that reads out image data stored in the memory and outputs the image data read out from the memory for confirmation display to a display device in accordance with termination of the recording operation of moving image data,
   wherein the review unit reads out image data of the number of frames set by the setting unit from the memory.

2. An apparatus according to claim 1, wherein the review unit reads out frames of all image data stored in the memory, in a case that the number of frames of the image data for confirmation display stored in the memory is equal or smaller than the number of frames set by the setting unit.

3. An apparatus according to claim 1, wherein the review unit selects image data for the set number of frames from among image data stored in the memory and reads out the selected image data, in a case that the number of frames of the image data for confirmation display stored in the memory is larger than the number of frames set by the setting unit.

4. An apparatus according to claim 1, further comprising:
   a reception unit that receives an instruction to start recording of moving image data and an instruction to stop recording of the moving image data,
   wherein the extraction unit starts the extraction processing in accordance with the instruction to start recording, and stops the extraction processing in accordance with the instruction to stop recording.

5. An apparatus according to claim 1, wherein the setting unit further sets whether or not to display image data stored in the memory for confirmation display on the display device, and the review unit does not read out image data from the memory even if the recording of the moving image data is terminated, in a case of the setting unit sets to not display the image data stored in the memory for confirmation display.

6. An imaging apparatus comprising:

an image sensing unit;

a recording unit that records moving image data obtained by the image sensing unit in a storage medium;

an extraction unit that extracts a frame of a portion of the moving image data in accordance with a predetermined condition during recording operation of the moving image data by the recording unit, and stores image data of the extracted frame for confirmation display in a memory;

a setting unit that sets a playback time period of the image data stored in the memory for confirmation display; and a review unit that reads out image data stored in the memory and outputs the image data read out from the memory to a display device in accordance with termination of recording of the moving image data, wherein the review unit reads out image data corresponding to the playback time period set by the setting unit from the memory.

* * * * *